United States Patent [19]

Bergeron, Jr. et al.

[11] 3,978,291

[45] Aug. 31, 1976

[54] AUTOMATED MAIN DISTRIBUTING FRAME SYSTEM

[75] Inventors: Robert Francis Bergeron, Jr., Budd Lake, N.J.; Hamilton Southworth, Jr., New York, N.Y.

[73] Assignee: Bell Telephone Laboratories, Incorporated, Murray Hill, N.J.

[22] Filed: Sept. 9, 1974

[21] Appl. No.: 504,294

[52] U.S. Cl. ............................... 179/16 R; 179/98
[51] Int. Cl.² ..................... H04Q 1/18; H04M 3/00
[58] Field of Search ........................... 179/98, 16 R

[56] References Cited
UNITED STATES PATENTS

| 2,633,502 | 3/1953 | Carpenter et al. | 179/51 R |
|---|---|---|---|
| 3,345,599 | 10/1967 | Henschen et al. | 339/18 C |
| 3,562,435 | 2/1971 | Joel | 179/16 R |
| 3,763,325 | 10/1973 | Kappel et al. | 179/98 |
| 3,796,848 | 3/1974 | Southworth | 200/175 |
| 3,838,317 | 9/1974 | Coyne | 317/119 |

*Primary Examiner*—William C. Cooper
*Attorney, Agent, or Firm*—A. D. Hooper; R. O. Nimtz

[57] ABSTRACT

An automated main distributing frame system comprises a multistage network with each stage including passive switches on which cross connections are made by shared, automated actuators under computer control to thereby provide paths through the network. Test access can be provided through the actuators to both switched and nonswitched lines. The switches are arranged in modules so that the system can be expanded from a small initial size to an ultimate capacity as the need arises by the addition of switch modules without any retermination of existing connections. In some network configurations the system provides for rearrangements to eliminate first trial blocking of desired connections.

37 Claims, 25 Drawing Figures

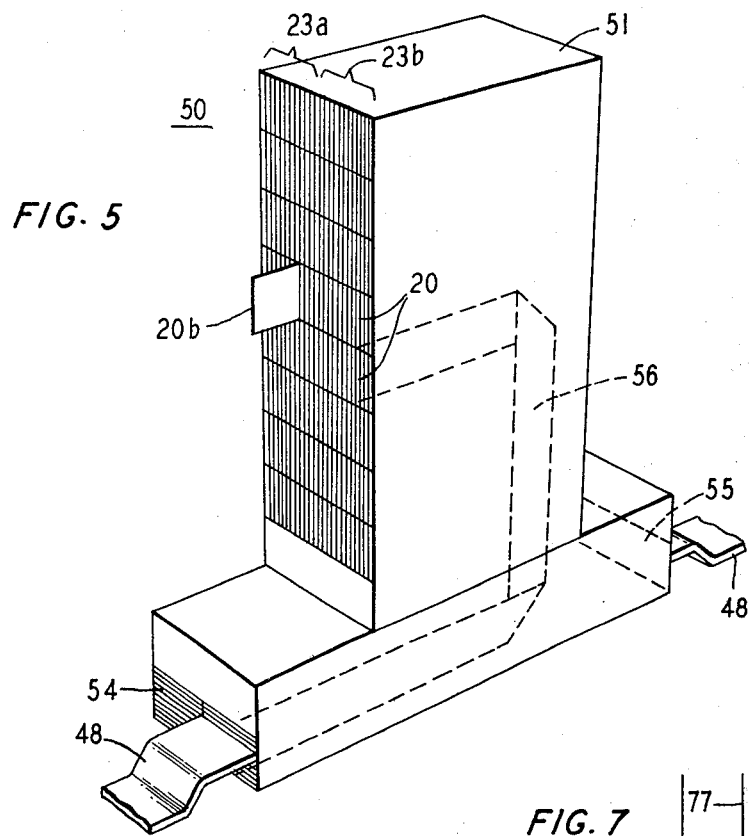
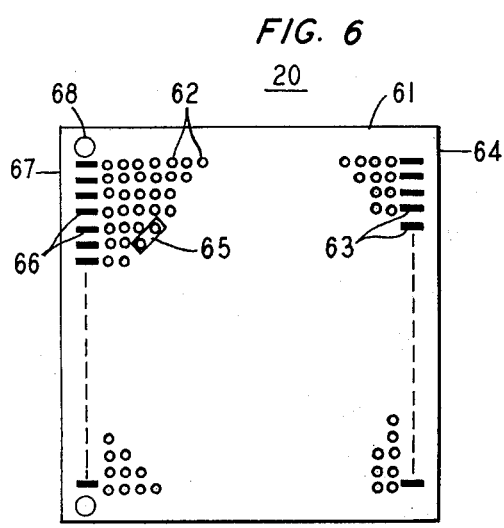
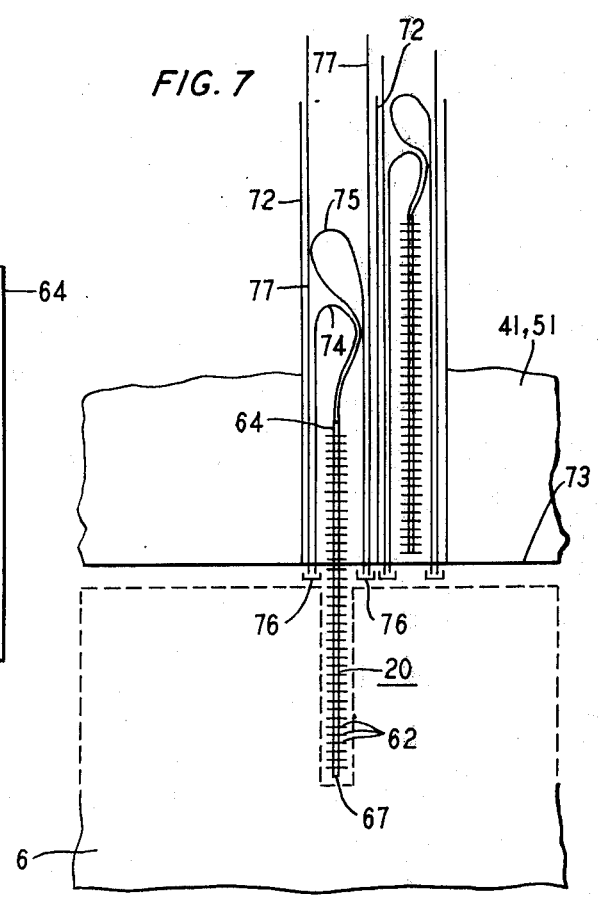

$K^2$ CABLES
K PAIRS EACH
(K=2)

$K^2$ CABLES
K PAIRS EACH
(K=3)

AUTOMATED MAIN DISTRIBUTING FRAME SYSTEM

BACKGROUND OF THE INVENTION

1. Field of the Invention

This invention relates to cross-connection field arrangements, and particularly to switching system main distributing frame network arrangements.

2. Description of the Prior Art

The adoption of the principle of centralization of common switching equipment produced the need to provide flexibility of interconnection between outside cable plant and central office equipment. Thus, a main distributing frame evolved which provides terminations for outside plant cable pairs on a fixed basis on one side of the frame with similar terminations for inside plant conductors on the other side of the frame. Wire cross connections or jumpers, manually placed, then connect the desired central office circuit to the proper outside plant cable pair. Accordingly, the main distributing frame, in essence, constitutes a cross-connection field which increases in size in direct relation to office size. Although substantial technological improvements have occurred in automatic switching systems in intervening years, the basic main distributing frame design presently in use throughout the world has not changed in over half a century.

The retention of the original main distributing frame arrangement is attributable, in part, to certain advantages which it presents. For example, it is completely nonblocking in nature. Thus, any particular outside plant cable pair is capable of physical connection to an appropriate central office circuit by placing a cross-connection pair. The physical termination of conductors also provides a point for maintenance test access. In addition, the physical equipment of which the main distributing frame is constructed consists principally of iron work and terminal strips, thus constituting a relatively low plant investment. However, these factors are no longer sufficiently advantageous when it is recognized that, although the plant investment is low, the continuing need for investment in labor is extremely high. In addition, existing main distributing frame arrangements in many cases have grown far beyond their initially estimated sizes, thus forcing unreasonable measures to be taken to provide the necessary capacity. Massive reterminations, the physical requirement that portions of the distributing frame be segregated and interconnected with large cross-connection tie cables, and the phenomenal growth of individual switching system offices have contributed to maintenance problems, which in some instances have rendered many cross-connection changes impossible or at least prohibitively expensive. And, finally, cross-connection jumper congestion, massive record-keeping problems and the limitation of access for test purposes further compounds the disadvantages in view of the physical complexity of present day distributing frames.

Approaches to solving the main distributing frame problems have included the development of modular manular frames and the development of automated frame administrative systems such as a system for preferential assignment of jumpers for use with either the existing frame or the modular frame. However, it has been found that such improved manual systems are not appropriate for many applications such as large metropolitan wire centers and centers containing large numbers of pairs such as trunks and special service circuits not subject to preferential assignment and other automated frame administration systems.

Conventional call-switching technology could be readily applied to the main distributing frame. However, because of the large switching capacity which would be required, a call-switching distributing frame would be prohibitively expensive. Such an application of call-switching technology fails to take advantage of the relatively low switching speeds and low frequency of operations (e.g., about one change per circuit per year on the average) which are required in the distributing frame as compared with the relatively fast speeds and response required in conventional switching machine applications.

U.S. Pat. No. 3,562,435 issued Feb. 9, 1971 to A. E. Joel, Jr. teaches a switching system arrangement in which the main distributing frame function is automated through implementation of an automatically controlled rearrangeable switching network. Although the Joel teaching constitutes a substantial advance in the art, it still has certain disadvantages including the use of "active" switch devices such as relays and contacts which would add significantly to the cost of the distributing frame.

U.S. Pat. No. 3,763,325 issued Oct. 2, 1973 to J. G. Kappel et al. discloses a distributing frame manual switch network which also represents a significant advance. However, Kappel et al.'s system also has certain disadvantages including the manual placing of jumpers or connections in the network stages, the lack of full flexibility in allowing connections between terminals on the same side of the network, and the inability to configure installations in a broad range of sizes.

Accordingly, it is an object of this invention to provide a distributing frame system which permits the automatic establishment of cross connections and connections for test access without a prohibitive increase in plant investment.

Another object is to provide a main distributing frame system permitting complete flexibility of interconnection and growth of the system from an initially installed size to any of a broad range of ultimate sizes.

SUMMARY OF THE INVENTION

The foregoing objects and others are achieved in accordance with this invention by an automated main distributing frame system utilizing a multistage network with each stage including passive switches therein. The switches are arranged in modules so that the system can be expanded from an initial small size to a broad range of ultimate sizes by the addition of switch modules without retermination of any existing connections and so that the system can be laid out in different physical configurations to conform to the available floor space. Cross connections on the switches of the various stages are made to establish a path through the network by shared automated actuators under computer control. The actuators provide test access through the frame system for both switched and nonswitched lines. The system utilizes a single-line rearrangement strategy in specific ones of the allowable network configurations to eliminate the need for low first-trial blocking. Flat multiconductor cable and associated rotators or fan out devices provide the required interstage fanout of connections.

BRIEF DESCRIPTION OF THE DRAWING

The invention will be more fully comprehended from the following detailed description and accompanying drawing in which:

FIG. 5 is a perspective representation of another type of module used in the system;

FIG. 6 is a representation of the passive switch utilized in the modules;

FIG. 7 is a plan view representation of the mounting of the switches of FIG. 6 in the modules of FIGS. 4 and 5;

DETAILED DESCRIPTION

Figure 1:
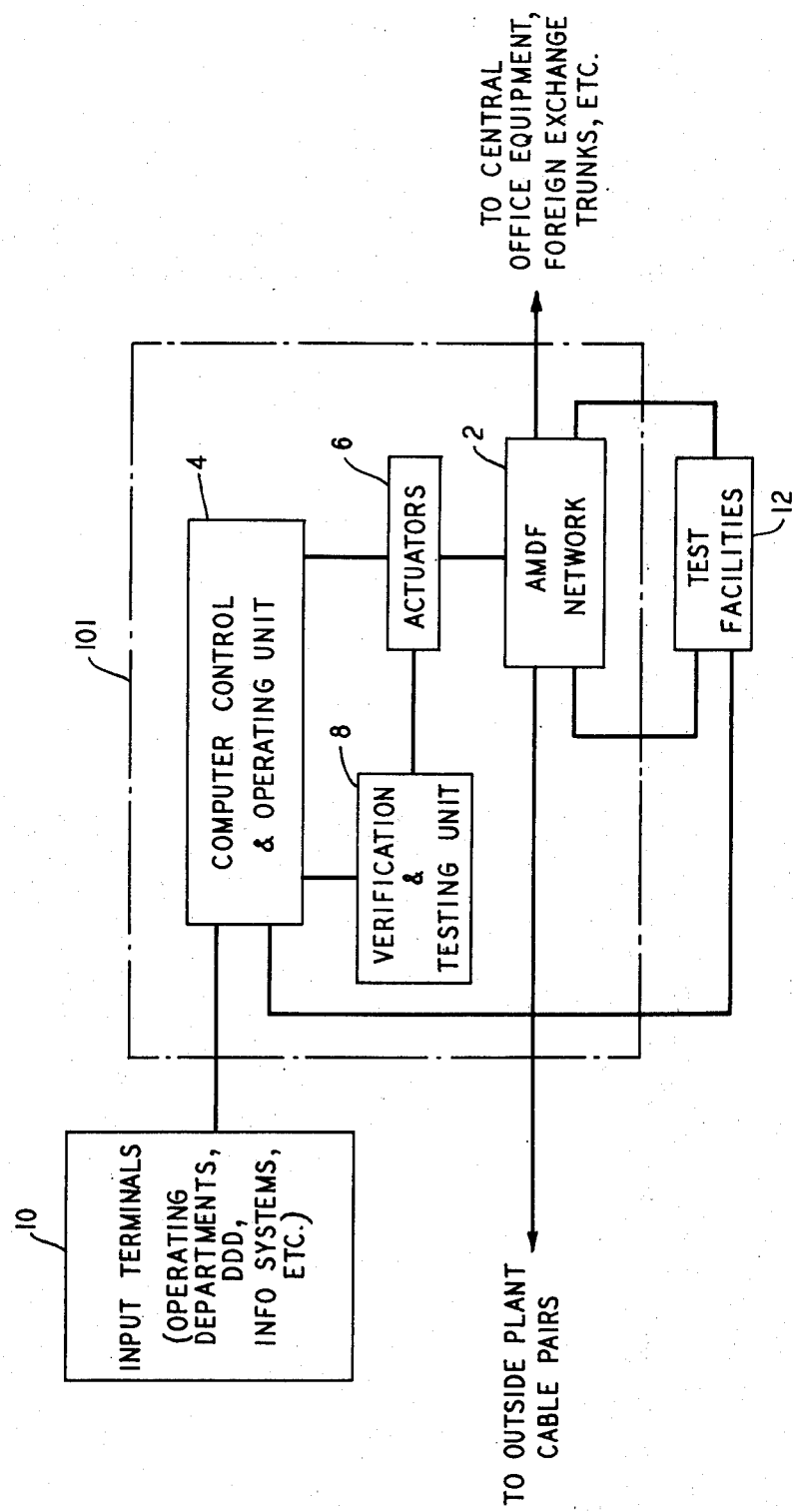
FIG. 1 is a block diagram representation of the system of this invention.

FIG. 1 is a block diagram representation of an automated main distributing frame (AMDF) system 101 in accordance with this invention showing its interfaces with other portions of the telephone system. System 101 includes a cross-connection field or network 2 which is serially inserted between input and output terminals which, for example, are respectively connected to outside plant cable pairs and central office equipment.

As will become apparent subsequently, the system of this invention provides for the interconnection of input terminals with other input terminals as well as output terminals and conversely in network 2. The operation of automated main distributing frame system 101 is controlled by computer control and operation unit 4 which directs actuators 6 and verification unit 8, respectively, in establishing or terminating connections in network 2 and verifying the accuracy of such connections as desired. Control and operation unit 4 is responsive to inputs from input signaling units or terminals 10 in performing its function. Terminals 10 can comprise inputs from the various operating departments of a telephone system such as plant, traffic, et cetera, inputs from the direct distance dialing network, and other sources which have an impact on the configuration of network 2. Alternatively, terminals 10 can comprise terminals such as teletypewriters within the automated frame system 101 which receive data from various sources and transmit such data in proper form to computer unit 4. Network 2 also interfaces with appropriate test facilities 12 which can include apparatus for both manual and automatic testing of circuits through network 2. The various parts of system 101 will be discussed in more detail in the following.

System 101 can be configured in a broad range of ultimate sizes depending upon the particular network 2 used. The basic criteria for network 2 are that: (1) it should have as nearly as possible the connectability properties of the existing main frame which include non-blocking operation; (2) it should enable graceful growth from an initial size to a broad range of ultimate sizes as the need arises; and (3) it should be a cost effective network which takes advantage of high density low cost technology such as mass termination techniques.

In accordance with this invention a network satisfying the above criteria comprises a multistage network which utilizes passive switches. The switches are passive in that they contain no built-in actuation or control mechanisms such as the relay in a relay-contact combination. The passive switches are arranged or packaged in modules. For example, a module can comprise a plurality of switches of one or more stages of the network associated in one group. The use of modules allows a broad class of networks to be configured from a limited number of basic modules; provides for a growable system through the addition of modules as needed; and allows the system to be fitted to the shape of the available floor space. Cross connections on the passive switches are established and terminated by actuators which are shared by a plurality of switches. Specific embodiments of networks having the foregoing features and usable as network 2 will now be discussed.

Figure 2:
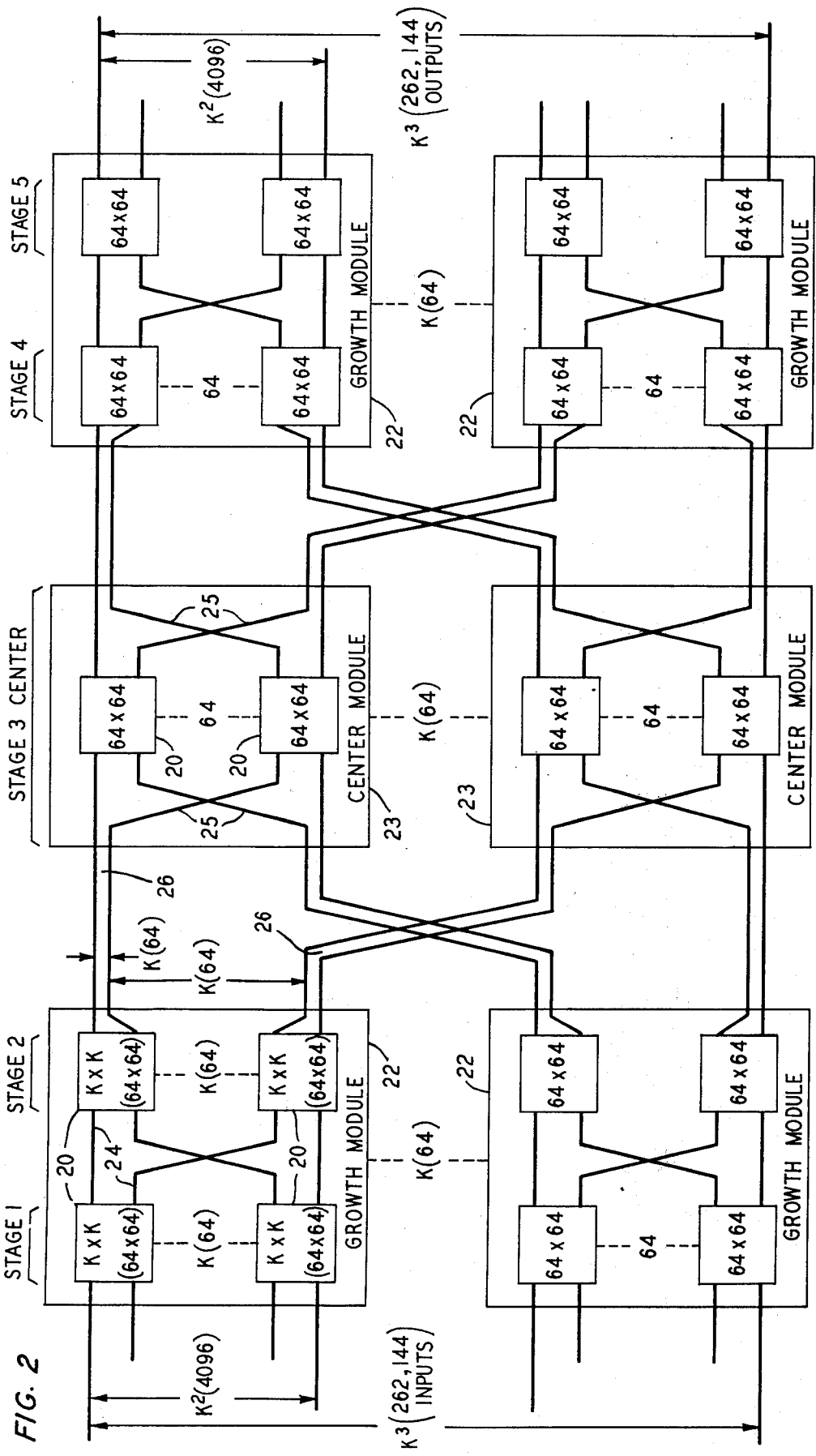
FIG. 2 is a topological representation of one embodiment of the network utilized in the system of FIG. 1 in terms of the switches and links therein.

In one embodiment, network 2 comprises a five-stage, rearrangeable, expandable, series-parallel network as shown in schematic form in FIG. 2 in terms of switches and links. Stages 1 and 2 are symmetric about center stage 3 with stages 4 and 5. Each stage of network 2 comprises a plurality of square, K × K switches 20 having K inputs and K outputs which can be interconnected with each other, i.e., inputs to inputs, inputs to outputs, and outputs to outputs. It should be kept in mind that the inputs and outputs each can comprise a pair of conductive elements such as the tip and ring of a typical telephone circuit. The network 2 will be described with respect to a specific embodiment where K is sixty-four. However, it should be kept in mind that other size switches could be utlized. Network 2 utilizing square, 64 × 64 switches has an ultimate capacity of terminating 262,144 inputs and outputs, i.e., $K^3$ inputs and outputs where K is sixty-four. The actual capacity realizable in a given system is determined by the number of switches 20 initially installed in center stage 3. Realization of the ultimate capacity of $K^3$ inputs and outputs requires the initial installation of $K^2$ switches in stage 3. Thus the capacity for any given system is $MK^2$ where MK is the number of switches actually installed in center stage 3. In the illustrative embodiment the full complement of $(64)^2$ or 4096 switches is included in center stage 3 so that network 2 is expandable to the ultimate capacity of $(64)^3$ inputs and outputs indicated above.

The switches 20 of stages 1 and 2 and stages 4 and 5, respectively, are grouped together in growth units or modules 22. Each module 22 includes sixty-four, i.e., K, switches 20 of each stage contained therein. For example, a growth module 22 on the input side of network 2 includes 64 first stage switches 20 and 64 second stage switches 20. Likewise a growth module 22 on the output side includes 64 fourth stage switches 20 and 64 fifth stage switches 20. Thus each growth module 22 contains a total of 128 switches 20. Each first or fifth stage switch 20 fans out to each second or fourth stage switch, respectively, in the same growth module 22. For example, the 64 outputs of the first switch 20 of stage 1 in a given module 22 are fanned out to the first inputs of the respective 64 switches 20 of stage 2 in the same module 22. Each module 22 then has 4096, i.e., $K^2$, inputs and outputs as indicated. The outputs 26 of the 64 switches 20 of stage 2 in module 22 are grouped, respectively, by switch for connection to stage 3.

Figure 3:
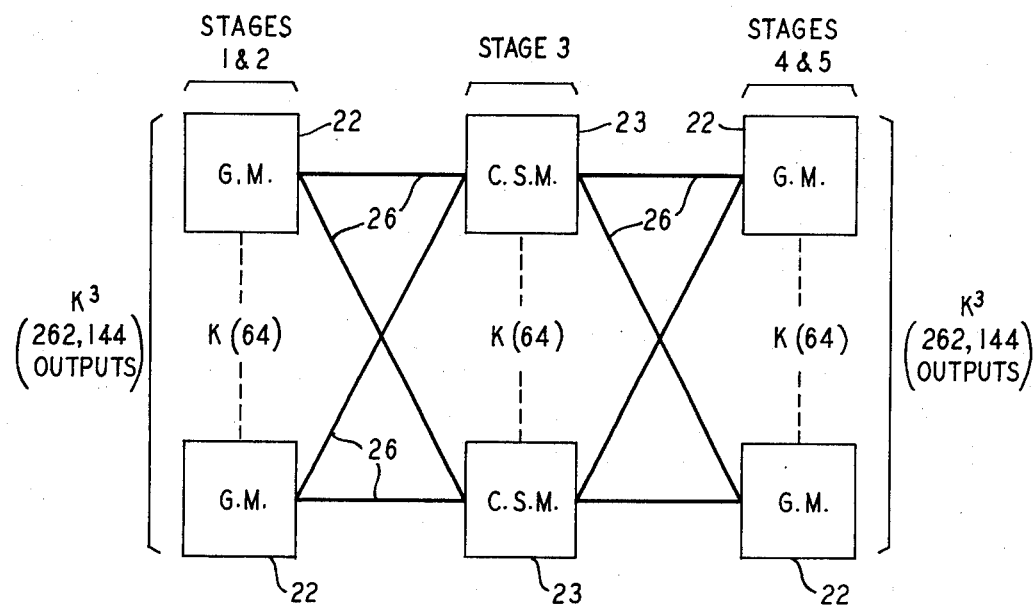
FIG. 3 is another representation of the network of FIG. 2 in terms of modules from which it is constructed.

The switches 20 of center stage 3 are also arranged in modules 23. Each module 23 includes 64, i.e., K, switches 20. Thus each module 23 also includes 4096 inputs and outputs. Fanouts 25 regroup these inputs and outputs into 64, i.e., K, groups 26 of 64, i.e., K, links each. These groups correspond to link groups connecting to growth modules 22. Link groups 26 are conveniently packaged as 64-pair, i.e., K-pair, cables. In the illustrative embodiment where center stage 3 includes a full complement of 64 modules 23 each having 64 switches 20 for a total of 4096 switches 20, each module 22 has one fanout or connection 24 to each center stage switch 20. For example, the first input module 22 containing switches 20 of stages 1 and 2 has its 4096 outputs connected to the first inputs of respective ones of the 4096 switches 20 of center stage 3. This connection pattern is accomplished by connecting the 64 link groups 26 of the input module 22 respectively to the 64 modules 23. FIG. 3 is a simplified schematic representation of network 2 in terms of growth and center stage modules 22 and 23, respectively, and the interconnections thereof. In this representation each link 26 represents 64 interconnections.

Network 2 is installed in modules as previously indicated. In the illustrative embodiment of FIGS. 2 and 3 the full complement of 64 center stage modules 23 is initially installed. However, the maximum complement of 128 growth modules 22, i.e., 64 modules 22 on both the input and output side of the center stage, for the indicated network need not be installed initially. Rather, the number of growth modules 22 needed for the desired capacity at this time are initially installed on the input and output sides of network 2. As additional need subsequently arises, additional growth modules 22 can be added on either or both sides to grow or expand network 2. Each added module 22 increases the capacity of network 2 by 4096 inputs or outputs. This growth of network 2 by the addition of modules 22 requires no retermination of existing connections. This "growth" feature without retermination offers significant economic advantages in that the initial capital investment required for implementing an automatic frame system 101 for relatively small wire centers is substantially reduced.

Figure 4:
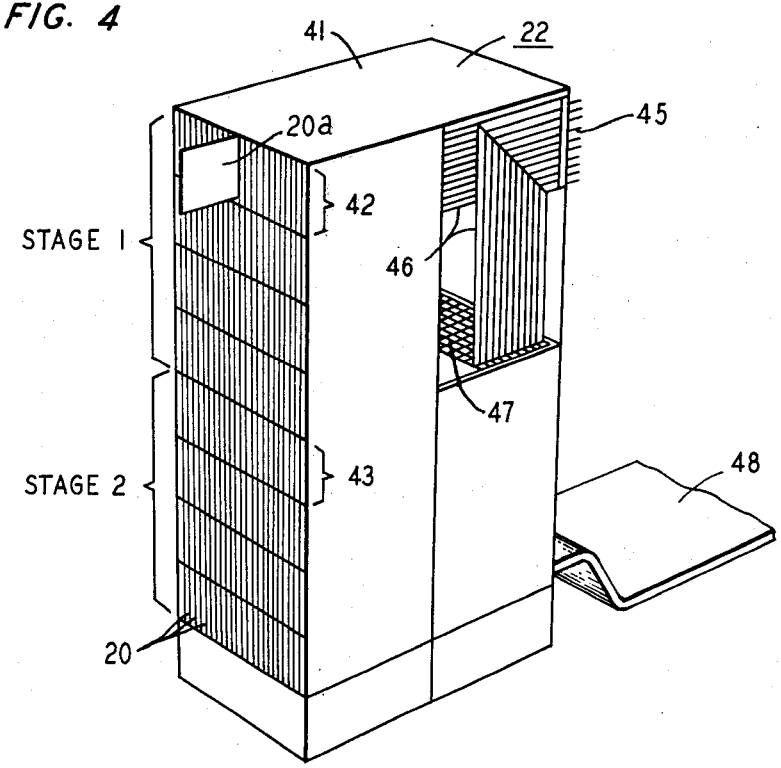
FIG. 4 is a perspective representation of one type of module utilized in the system.

The switches of both modules 22 and 23 advantageously are mounted in bookcase fashion in appropriate racks, cabinets, or similar mountings. A growth module 22 showing the mounting of switches 20 therein in bookcase fashion is shown in FIG. 4. For example, the 64 switches 20 of stage 1 of module 22 are mounted in the top four rows 42 of a cabinet or other mounting frame 41. The 64 switches 20 of stage 2 of modules 22 are mounted in the bottom four rows 43. Switches 20 are slideably mounted in cabinet 41 so that they can be withdrawn or pulled out as illustrated by switch 20a to provide access to the switch for the establishment and termination of connections thereon as will be explained in more detail subsequently. A terminal field 45 is provided on the back of cabinet 41 where connections can be made to outside plant or central office cabling. The terminal field 45 could, for example, comprise standard wire-wrap pins to which the appropriate cabling is connected. Connections or fanouts between stages 1 and 2, as illustrated by connections 24 in FIG. 2, are provided by flat flexible multiconductor cables 46 which fan out through rotators 47 as will be described later. The outputs from module 22, which are connected to the center stage modules 23 as illustrated in FIG. 3, comprise a set of flat cables 48 which, for example, might pass through a channel under the floor to the appropriate center stage modules, The switches 20 of the modules 23 of center stage 3 are also mounted in bookcase fashion in an appropriate cabinet 51 as shown in FIG. 5. Since each center stage module 23 includes only 64 switches 20 as compared with a total of 128 switches 20 in a growth module 22, two center stage modules 23a and 23b advantageously can be mounted in one cabinet 51 as a center stage package 50. Thus package 50 is physically similar to a growth module 22 with respect to the number of switches 20 therein. One center stage module 23a can comprise the left hand of package 50 and the other center stage module 23b can comprise the right half. Package 50 includes one set of rotators 54 which receives the stub cables 48 from growth modules 22 on the input side, i.e., stages 1 and 2, and another set of rotators 55 which receives the stub cables 48 from growth modules on the output side, i.e., stages 4 and 5. These rotators provide the proper fanouts to flat cable segments 56 which connect to switches 20. Switches 20 are also slideably mounted in cabinet 51 as represented by switch 20b.

Passive pin-connector type switches such as those disclosed in H. Southworth's U.S. Pat. No. 3,796,848, issued Mar. 12, 1974, and J. C. Coyne's application Ser. No. 378,579 filed July 12, 1973, since matured into U.S. Pat. No. 3,838,317 on Sept. 24, 1974, both assigned to the assignee of this application, advantageously can be used for switches 20. The term passive switch is used to means switches which include the conductor path only while the switch actuation and control mechanism are separated therefrom. This is opposed to active switches such as relays and contacts where the control, actuation and path provision are integrated. As shown in FIG. 6, such a switch 20 comprises in general a printed circuit board 61 having an array of pin terminals 62 extending from one or both sides thereof. Pin terminals 62 are associated with conductors, not shown, which enter board 61 through terminals or lands 63 along one or both sides of one edge 64 of board 61. The conductors can be interconnected with each other as desired by interconnecting pins 62. This can readily be accomplished by placing a small connector 65 between the appropriate pairs of pins 62. The conductors are also connected to test lands 66 on one or both sides of edge 67 opposite edge 64 for reasons to become more apparent subsequently. Board 61 includes registration holes 68 along edge 67.

FIG. 7 schematically illustrates a plan view of the slideable mounting of switches 20 of FIG. 6 within cabinets 41 and 51 of FIGS. 4 and 5, respectively. Switches 20 are slideably mounted between partitions 72 so that edge 67 of switch 20 is to the front 73 of cabinet 41 or 51. At its rear edge 64, switch 20 is connected to flexible cable loops 74 and 75 which respectively interconnect switch 20 through appropriate splices 76 with interstage cabling 77 such as represented by cables 46 and 56 of FIGS. 4 and 5, respectively. For example, cable loops 74 and 75 can comprise flexible flat cable loops which connect to appropriate input and output lands 63 along edge 64. Flexible loops 74 and 75 allow switch 20 to be withdrawn from cabinet 41 or 51 to expose terminal pins 62 whereby cross connections can be made on switch 20 without disrupting existing connections through the switch. The connections to the exposed pins 62 are made by actuator 6 which will be discussed in more detail subsequently.

Figure 8:
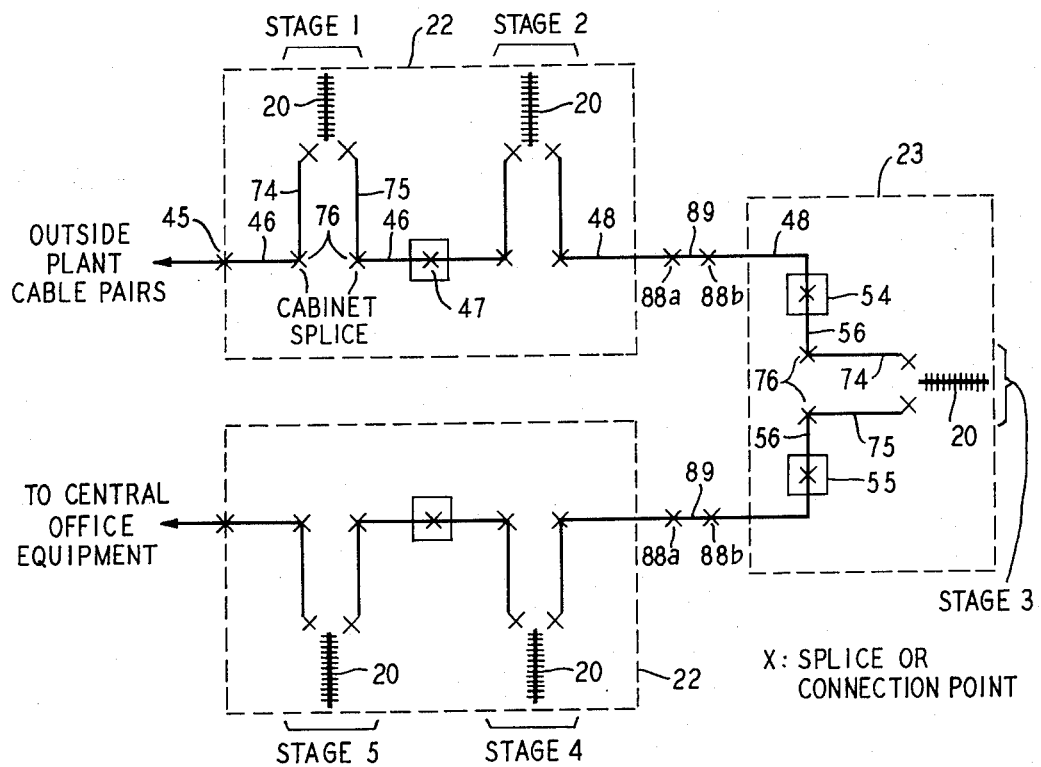
FIG. 8 is a schematic representation of the connections in a typical circuit through the system of FIG. 1.

As indicated above, flat flexible cable advantageously can be used for wiring within automatic frame system 101. Various types of flat flexible cable well known in the art such as that disclosed in U.S. Pat. No. 3,761,842 issued Sept. 25, 1973 to W. B. Gandrud can be used for such applications. FIG. 8 is a schematic representation of the connections and wiring which can be used in a typical circuit traversing all five stages of network 2 and particularly showing where flat cable could be used. The same numbers are used to designate the various elements in this designation as used in FIGS. 1–7. Outside plant cable pairs are connected to a terminal block or terminal field 45 on an input growth module 22. a flat cable 46 connects terminal field 45 to a cabinet splice 76 which is then connected to a switch 20 in stage 1 by a flexible flat cable loop 74 as discussed with respect to FIG. 7. Outputs from switch 20 are connected by flexible flat cable loop 75 through another cabinet splice 76 and flat cable 46 to a rotator 47 which provides the proper row-to-column transformation for fanning out the outputs of switch 20 in stage 1 to the switches 20 of stage 2. Connections to and from switch 20 of stage 2 are made in a manner similar to that previously discussed with respect to switch 20 of stage 1. Outputs from switch 20 of stage 2, which also comprise the outputs from module 22, are fed to an intermodule splice point 88a by flat cable stub 48 as shown in FIG. 4 where a segment 89 of different types of cable with better transmission properties can be inserted for the relatively long intermodule runs or links. This segment 89 terminates at a second intermodule splice 88b. From splice 88b a flat cable segment 48 leads to rotators 54 on center stage module 23. From rotator 54 a flat cable 56 leads to the cabinet splices 76 and thence to switches 20 via loop 74 as previously discussed. The outputs from center stage switches 20 go through flexible loop 75 to cabinet splice 76 and thence through cable 56 to output rotators 55. The connections from rotator 55 to output module 22 are the same as previously described between rotator 54 and input module 22. Likewise the connections within output module 22 are the same as those described with respect to input module 22. Thus it should be apparent that flat, flexible multiconductor cable can be used for virtually all of the wiring within network 2 including segments 46, 74, 75, 48, and 56.

Figure 9:
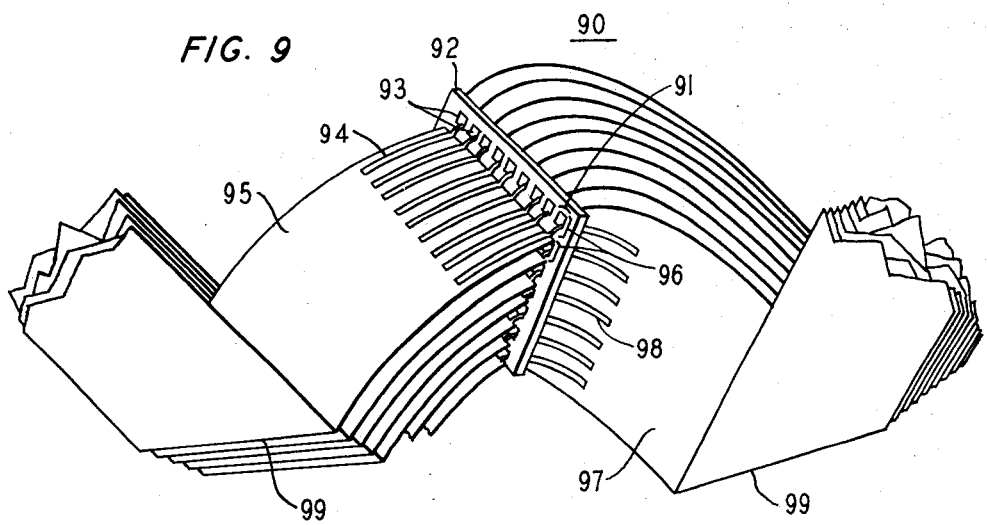
FIG. 9 is a representation of the flat cables and rotators used for interstage wiring.

As mentioned above, rotators or fanout devices are needed between the stages of network 2 to provide the proper fanouts required by the network and as shown in FIGS. 4, 5, and 8. FIG. 9 indicates one such rotator 90 which can be used as element 47 and elements 54 and 55 in FIGS. 4 and 5, respectively. Rotator 90 comprises a printed circuit board 92 having a matrix of plated-through holes and lands 93. The conductors 94 of flat flexible cables 95 are connected to lands 93 in rows 96 on one side of board 92. On the other side, the conductors 98 of other flat cables 97 are connected to the lands 93 in columns 91. Thus each cable 95 on one side of board 92 fans out to all other cables 97 on the other side of board 92. For example, cables 95 are connected to respective switches 20 in stage 1 of network 2 and cables 97 are connected to respective switches in stage 2 of the network. It should then be apparent that each switch in stage 1 fans out to every switch in stage 2 as required as previously discussed.

The use of flat cable offers many advantages in such areas as making required terminations and density of terminations. For example, the conductors 94 of cables 95 can rapidly be connected to a row 96 of lands 93 and conductors 98 in a cable 97 can be connected to a column 91 of bands 93 by well-known mass solder techniques. Similarly flat cable can be connected to the lands or terminals 63 and 66 on the switches 20 in FIG. 6 very rapidly and economically. Splices between flat cable segments as may be required at cabinet splices 76 of FIGS. 7 and 8 can be made by similar economical mass production techniques. Conventional wiring utilizing discrete conductors and terminations would be very expensive because of the large number of terminations required by system 101. Flat cable can be readily folded as indicated by folds 99 in FIG. 9 to provide changes in direction for proper presentation of the cable to rotators and the like. Flat cables can be stacked to provide a very high density of conductors. Various other features and advantages of such cable are well known in the art.

As indicated earlier, the switches 20 utilized in system 101 are passive switches, such as pin connector switches, on which cross connections must be set up or made by an independent actuator 6. Because of the relatively low speed required for establishing cross connections in system 101, a single actuator 6 can be shared by a large number of switches 20 to obtain substantial economies. The actual number of actuators used in a given system will depend upon the maximum time allowable for setting up a connection under typical conditions, the number of connections to be made, and the time allowable for providing test access to switches 20 and similar constraints. Even under the most stringent requirements expected, a limited number of actuators will be able to service a very large main distributing frame system.

Figure 10:
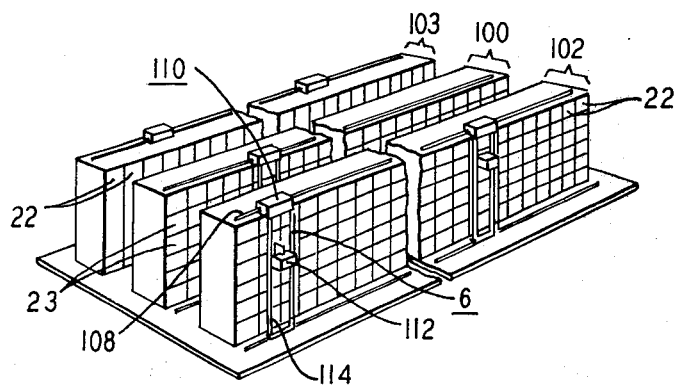
FIG. 10 is a perspective representation of a typical layout for the system of FIG. 1.

FIG. 10 discloses one layout for a system 101 using shared actuators. A row or rack 100 of center stage modules 23 is placed between respective rows or racks 102 and 103, respectively of input and output growth modules 22. Each row or lineup of modules 22 and 23 has one or more associated roving actuators 6 for setting up connections on the switches 20 in the modules of a particular row or portion thereof. Each actuator 6 comprises an x-y coordinate locating system including a guide rail or similar track 108 along the top of the module row and a motor or drive means 110 for moving actuator 6 horizontally along the track 108 to position it over a particular column of switches including the switch in the module to be serviced. A connector placement head or means 112 is mounted on a vertical guide or track 114 and can be driven vertically therealong by a motor or similar drive to accurately position head 112 over the particular switch of interest. Head 112 includes apparatus therein for withdrawing switches 20 from the module cabinets as illustrated in FIGS. 4, 5 and 7 and placing or removing connectors over appropriate pairs of pins therein for establishing or terminating cross connection on the particular switch. The copending application Ser. No. 504,299 of H. J. Friedrichsen-P. F. Mahr-A. O. Scharwz filed concurrently herewith and assigned to the assignee hereof discloses apparatus which advantageously can be used for actuator 6. However, commercially available coordinate drive equipment could also be modified to perform the positioning and connector placement and removal functions required by actuator 90.

Figure 11:
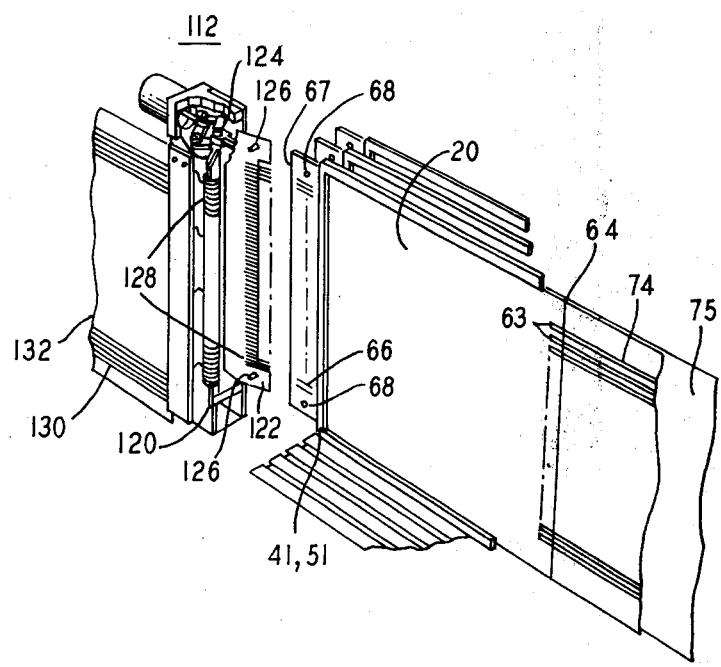
FIG. 11 is a representation of a portion of the automated actuator for use with the passive switches in the system.

Some particularly advantageous features of head 112 of actuator 6 are shown in more detail in FIG. 11. Head 112 includes two extending jaws or lips 120 and 122 which are pivotably or hingedly mounted at hinge 124 so that they can open and close with respect to each other. At least one jaw 122 includes engagement pegs or registration pins 126 thereon and both jaws 120 and 122 include contacts 128 which connect to conductors 130 such as conductors in a flat cable 132. As previously discussed with respect to FIGS. 4, 5 and 7, a switch 20 is mounted in a frame or cabinet 41 or 51 with one edge 67 thereof containing test lands 66 accessible at the front of cabinet 41 or 51. Edge 67 also includes registration holes 68. When head 112 of actuator 6 is properly positioned adjacent switch 20, jaws 120 and 122 can be closed about edge 67 so that pins 126 engage holes 68 to accurately position switch 20 with respect to head 112. Switch 20 can then be withdrawn from cabinet 41 or 51 and connectors removed or placed on appropriate pins thereon. During this time that jaws 120 and 122 are closed about edge 67, contacts 128 mate with test lands 66 to allow any desired tests or verifications of the circuits and connections on switch 20. Conductors 130 of cable 132 can be connected to an appropriate test or verification unit such as unit 8 of FIG. 1 for this purpose. This testing requires no disturbance of the connections made to the contacts 63 on the rear edge 64 of switch 20 by input and output wiring such as the flexible cable loops 74 and 75 of FIG. 7.

The layout shown in FIG. 10 is by no means indicative of the type of layout which system 101 must assume. The use of modules as building blocks allows system 101 to be laid out in just about any conceivable configuration to fit the available floor space. For example, input modules, center stage modules and output modules can be placed on separate floors if required. The number of actuators required will depend in part upon the particular layout configuration used.

The operation of automated main frame system 101 is controlled by a computer unit 4. Systems such as system 101 requiring repetitive logic functions for locating and selecting paths through networks, maintaining records of the status of a network or system, testing or verification of paths through a network and like functions are ideally suited for such computer control. As presently well known in the art, stored program path hunting and selection are readily applicable to the path selection function. A computer system's core and disk memory is well adapted for the record keeping function and audit programs that can check out existing paths are applicable to the testing and verification function. Accordingly computer unit 4 advantageously includes such program and memory capability.

Inputs to computer unit 4 come from various input terminals 10. For example, a typical input might be from a terminal in the plant assignment department concerning the connection of a new subscriber. From the inputted data such as location of the subscriber and type of service desired, computer unit 4 assembles a pool of associations which can provide the requested service, i.e., a pool of input terminals on stage 1 to which the subscriber can be connected and output terminals on stage 5 to which the desired type of central office equipment is connected. For some service requests such as point-to-point orders there will be only one association, but for most requests there will be a plurality of associations. Computer unit 4 next picks one of the associations and hunts a path through the network for such association. There are a plurality of paths for each typical association and each path typically includes connections on and links between the five stages of network 2. If no path is found for an association, another association is chosen and the path hunting function is repeated. The probability that no path is found for an association is the first trial blocking probability of network 2 which is a blocking network. If all associations are exhausted without finding a path through network 2 to establish the desired service, computer unit 4 initiates a single-line rearrangement strategy to be discussed subsequently to obtain a path.

Where computer unit 4 does find and select a path it then directs actuators 6 to set up or connect this path through network 2. As previously mentioned, a typical path will include a connection on and a linkage between each stage of network 2. Accordingly, computer unit 4 directs one or more actuators 6, depending on the layout of system 101 and the total number of actuators utilized therein, to respective switches 20 in respective stages of network 2. Actuators 6 proceed to the designated switches 20, withdraw switches 20 from the respective module cabinets, install a connector between appropriate pins thereon to establish the needed connection, verify the status of connections on switches 20 via connections to the test lands described previously and then replace switches 20 in respective modules. When all connections are completed, the desired path has been established through the network between the subscriber's line and the required central office equipment. This corresponds to the placement of a vertical-to-horizontal jumper in a conventional manual main distributing frame.

While the foregoing has described a typical main frame connection in which outside plant is connected to central office equipment, it should be kept in mind that system 101 can also make all other main distributing frame type connections. For example, input-to-input connections, output-to-output connections and test connections, to be described in more detail subsequently, can be made. Such connections are made by computer unit 4 directing actuators 6 to cross connect the appropriate pairs of pins on one or more switches as previously discussed.

Figure 12:
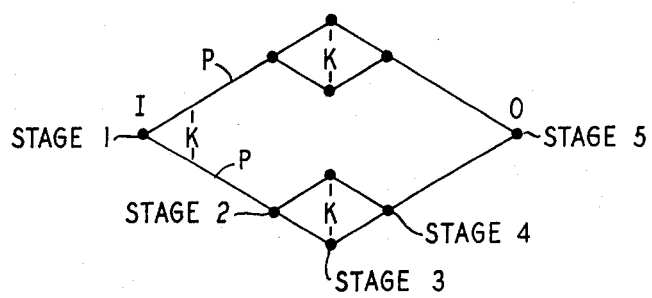
FIG. 12 is a graphical representation of the possible paths for providing a connection through the network of FIG. 2.
Figure 13:
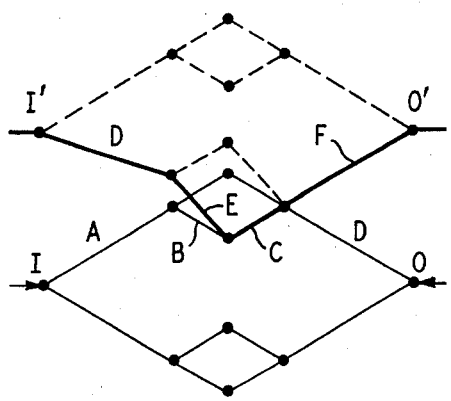
FIGS. 13–16 are schematic representations of various stages in the rearrangement of a path through the network of this invention to eliminate blocking.
Figure 14:
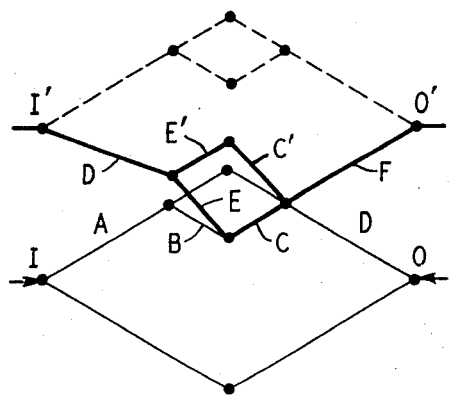
Figure 15:
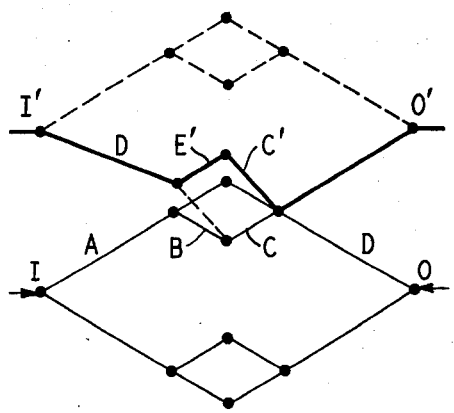
Figure 16:
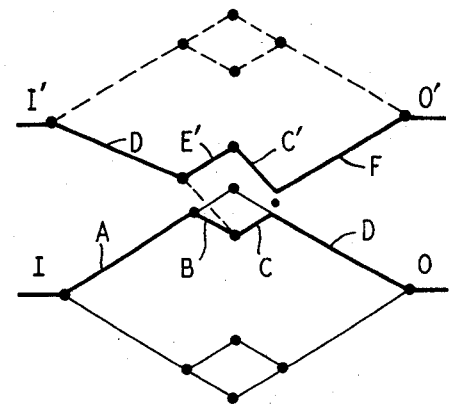

When computer unit 4 fails to find an open or free path through network 2 for any association in the pool which can provide the desired service, a "single-line rearrangement strategy" is implemented as previously indicated. When all paths are blocked, computer unit 4 examines the connection to be made and determines those potential paths for making this connection which are blocked in only one like or stage of network 2, i.e., the computer unit 4 assembles a pool of "nearly complete paths." For example, FIG. 12 is a linear graph of a desired connection between an inlet terminal I on stage 1 and an outlet terminal O on stage 5 showing a plurality of possible paths P for making this connection some of which are blocked in only one link. For each such path P, having only one blocked link, computer unit 4 identifies the blocking path, i.e., the path through the network occupying this blocked link. Computer unit 4 then applies the previously discussed path finding routines to find an alternate path which will provide the same connection, i.e., an alternate path between the input and output terminals associated with the path occupying the blocked link. If such an alternate path is found, it is setup or connected in parallel with the existing blocking path by actuators 6. The blocking path is then terminated or taken down by actuators 6 thereby freeing the blocked link therein for use in completing the connection that was originally blocked thereby. No existing service is disturbed since the alternate path is set up before the old path is taken down. This single-line rearrangement strategy is shown in more detail in FIGS. 13–16. FIG. 13 shows the desired connection to be made between input terminal I and output terminal O comprising links A, B, C, and D. However, link C is presently utilized in the path between terminals I' and O' which comprises links D, E, C, and F. As shown in FIG. 14 computer unit 4 determines that an alternate path comprising links D, E', C', and F can be provided between terminals I' and O'. Accordingly this alternate path is set up with links E' and C' in parallel with links E and C. Links E and C are then taken down thereby freeing link C for the originally blocked path as shown in FIG. 15. The path between terminals I and O is then set up as shown in FIG. 16 using link C.

Figure 17:
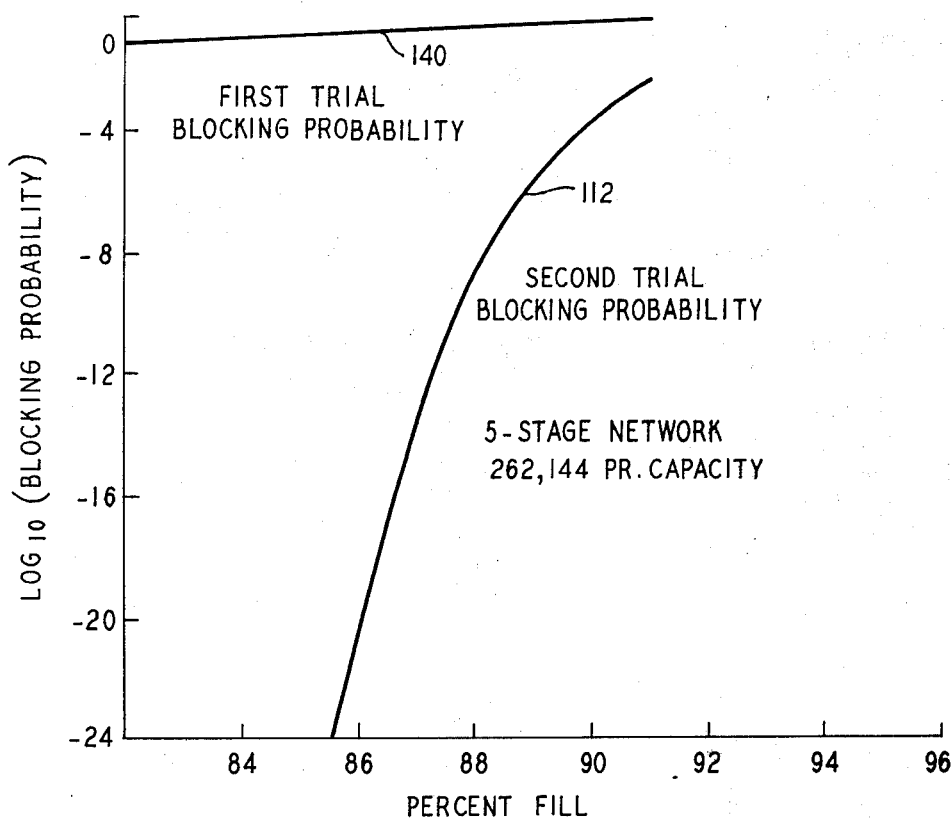
FIG. 17 is a graph of the blocking probabilities of the system.

Because of this single-line rearrangement strategy, it is not necessary to strive for a low first trial blocking probability through network 2. Thus network 2 can be used more efficiently with respect to percentage usage of the stages. FIG. 17 is an illustrative graph of the first and second trial blocking probabilities of network 2 as a function of the percentage fill of the terminals of the stages, i.e., percentage fill of the possible 64 inputs and outputs of the switches in each stage in the illustrative embodiment. It can be clearly seen that while the first trial blocking probability 140 is relatively high, the second trial blocking probability 142 brought into play by the rearrangement strategy is very low and quite acceptable. For example, at the maximum expected fill of 90 percent, the second trial blocking probability is approximately $10^{-6}$.

As indicated above, when an actuator 6 removes a switch 20 from its module to set up or terminate a cross connection thereon, it also establishes contact with the test lands or terminals 66 along the edge of the switch as discussed with reference to FIG. 11. This simultaneously establishes contact with all inlet and outlet conductor pairs on the switch. In order to maintain a highly accurate set of records of the status of system 101, verification and testing unit 8 under the control of computer unit 4 executes a series of continuity tests to determine which connections are made on a switch 20 and compares these with the existing records while the test lands 66 on the switch 20 are engaged by an actuator 6. For example, a scanning system utilizing a low level signal which would not interfere with signals being transmitted through network 2 can rapidly scan through all connections on a single switch 20 to determine their status. The newly established or terminated connection is also checked after completion to insure that actuator 6 has properly carried out the work order received from computer unit 4. Verification unit 8 can comprise a part of computer unit 4 or can be built into actuator 6 if desired. Other types of quick test inputs from verification and testing unit 8 can also be inputted to switch 20 through actuators 6.

While the access or connection of actuators 6 to the test lands 66 of a switch 20 was described in connection with the establishment or termination of a cross connection on the switch, it should be apparent that an actuator 6 can be directed to a switch 20 solely for the purpose of providing test access through the test lands 66. Unlike systems providing test access through the central office equipment, test access in this system 101 can be provided for both switched and nonswitched lines, such as foreign exchange lines, as long as such lines pass through network 2. This test access for all lines, both switched and nonswitched, on the frame system 101 rather than through the central office equipment also allows fault sectionalization in that the tester can look from the frame system 101 toward either the outside plant or the central office.

Figure 18:
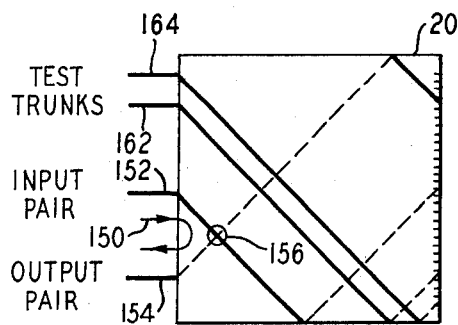
FIG. 18 is a schematic representation of a typical cross connection on a switch in an outer stage of the network.
Figure 19:
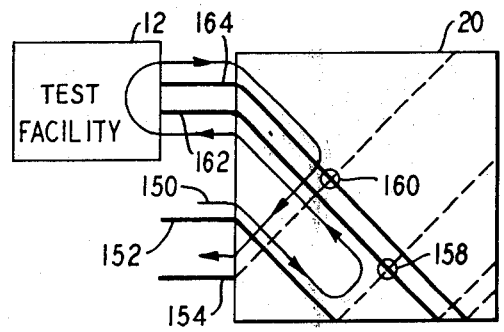
FIG. 19 is a schematic representation of a cross connection on a switch in an outer stage of the network for establishing a test connection.

As indicated above, verification and short term testing of switches 20 and connections thereon can readily be accomplished through actuators 6 by contacting the test lands 66 along one edge of the switches 20. However, where testing requiring a longer period of time is contemplated it is not desirable to have actuators 6 tied down to a specific switch 20 for the required test time. Instead actuators 6 switch the line under test to test facilities 12. One or more test access trunks are provided at each switch 20 of the first and fifth stages of network 2, i.e., these trunks are connected to respective ones of the 64 input (or output) lands or terminals on these switches. FIG. 18 is a schematic representation of a typical path or line 150 having a cross connection 156 on a switch 20 of stage 1 from input 152 to output 154 thereof wherein the switch being utilized is the previously mentioned switch shown in patent 3,838,317. Output 154 is then connected to the next stage. Connector 156 placed by an actuator 6 establishes the cross connection as discussed earlier. If a request for a "long-term" test on line 150 is received, actuators 6 remove connector 156 and place two new connectors 158 and 160 which respectively cross connect input 152 to unused outgoing test trunk 162 and cross connect incoming test trunk 164 to desired output 154. Test trunks 162 and 164 thus can be used to route line 150 through test facilities 12. This in effect is the same as the placement of a "shoe" on existing main frames. Test facilities 12 can include any desired type of test capability as is well known in the art including such functions as placing terminations such as shorts, open and loads of various kinds and the measurements of the effects thereof on the tested line. Concentrators and a distribution network well known in the art can be placed in the test trunks between the outputs of network 2 and test facilities 12 to provide the proper distribution to available test stations. After completion of the desired tests, actuators 6 remove connectors 158 and 160 and replace connector 156 so that line 150 is restored to its original or normal condition. Remote test access such as from the direct distance dialing network can be obtained via an appropriate terminal 10 inputting to computer unit 4.

Test access is normally required on a more urgent basis than the establishment or termination of subscriber cross connections in network 2. Accordingly, computer unit 4 can establish priorities for the execution of work orders by actuators 6 to insure that the more urgent test connections are provided when needed. However, system 101 should complete all cross connections whether or not priority, in substantially less time than is presently required for a manual main distributing frame.

It should be apparent from the foregoing that cross connections from an input to another input or from an output to another output on a particular switch 20 in any stage can also be set up by actuators 6 in case it is desired to loop back a circuit without going completely through network 2. This simply requires the placement of connectors between input pins or output pins, respectively, on the particular switch rather than between input and output pins in the typical situation.

The automatic scanning feature used in verification unit 8 can also be advantageously used during the transition from a manual frame to the automated frame 101 of this invention. During installation and transition, connections through the existing manual frame to which the automated frame system 101 is half-tapped can be identified by scanning through actuators which access the first and fifth stage switches of the automated frame system 101.

The main distributing frame system 101 has been described in the foregoing in terms of a specific network and a specific switch for use in such network. However, the modular approach to construction of a main frame system as proposed herein can be readily extended to a whole class of networks utilizing two kinds of modules as discussed and utilizing various size switches as will now be demonstrated.

Figure 20:
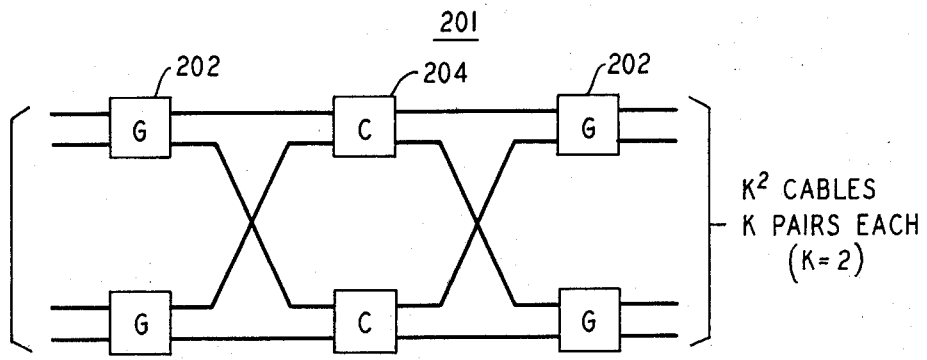
FIG. 20 is a block diagram representation of a network similar to FIG. 3 but utilizing different size switches therein.
Figure 21:
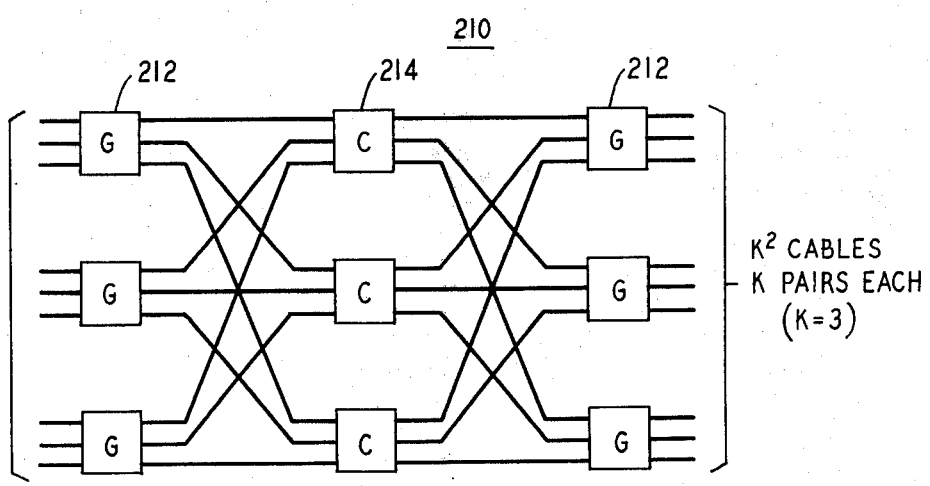
FIG. 21 is a block diagram representation of a network similar to FIG. 20 but utilizing still another size switch therein.

The size switch utilized in the network of FIGS. 2 and 3 is clearly not restricted to the 64 × 64 switch discussed. FIG. 20 shows in modular schematic a network 201 similar to network 2 but utilizing 2 × 2 switches. This network 201 includes five stages comprising growth modules 202 about center stage modules 204. Likewise, FIG. 21 shows in modular schematic form a five-stage network 210 similar to network 2 and 201 utilizing growth modules 212 and center stage modules 214 having 3 × 3 switches. Thus it should be apparent that various size switches to yield various capacity systems can be used including switches greater than 64 × 64.

As already briefly mentioned, network 2 utilizing 64 × 64 switches 20 which was discussed in detail is a growable network. If all 64 center stage modules 23 are initially installed, any desired number less than 64 input or output growth modules 22 can be initially installed and other growth modules 22 added subsequently as the need arises. Thus any size network from 4096 inputs and outputs (i.e., one each input and output growth module 22) to 262,144 inputs and outputs (i.e., 64 each input and output growth modules 22) can be put together. At any stage of growth the network provides full access, is fully flexible, is rearrangeable to eliminate blocking as discussed and can be expanded into the indicated maximum size without retermination of existing connections. The term full access is used to mean a network that in principle allows any terminal on one side of the network, i.e., input, to be connected to any terminal on the other side of the network, i.e., output. Fully flexible means that terminals in the same side of the network can be connected, i.e., inputs-to-inputs and outputs-to-outputs.

Figure 22:
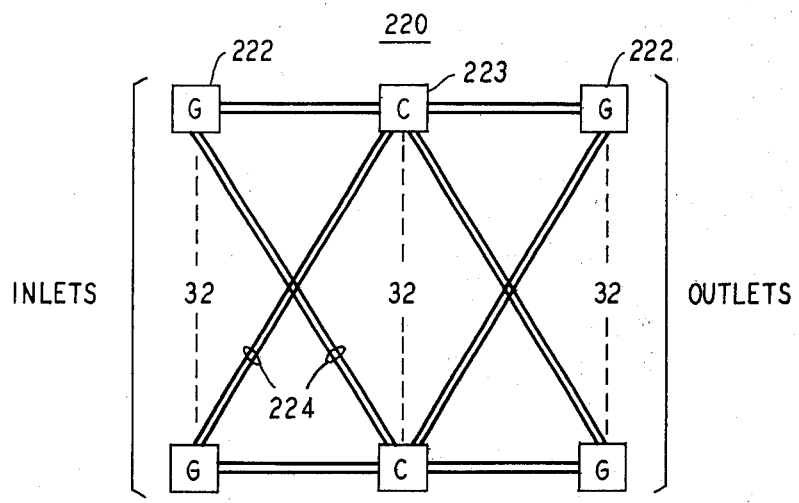
FIG. 22 is a block diagram representation of a network which is one-half the size of that of FIG. 3.

There may be many applications where the ultimate expected size of a main frame system is less than the 262,144 inputs and outputs discussed. Networks tailored to these different ultimate sizes can be readily constructed from the same two modules discussed. For example, if an ultimate size of no more than 131,000 inputs and outputs is expected (i.e., a system one-half the size of system 101), then only 32 center stage modules 23 are initially installed. Any number of input and output modules 22 can then be added up to a maximum of thirty-two to provide a full access, fully flexible, rearrangeable, growable network up to the ultimate size of approximately 131,000 inputs and outputs. FIG. 22 shows such a "half-size" network 220 in modular schematic form. In such a network 220 each growth module 222 has two cable fanouts to every switch in each center stage module 223 as represented by the double connection 224. It should be kept in mind that a 131,000 pair network can also be constructed by installing 64 center stage modules 223 and only 32 growth modules 222 on each side thereof. However, this is an inefficient layout if the ultimate expected size is only 131,000 pairs because the center stage modules 23 are only 50 percent utilized. Thus, it is better to use the "half-size" system. In general a broad range of ultimate size networks having a capacity of $MK^2$ pairs where $MK^2$ ranges from 4000 pairs to 262,000 pairs in increments of 4000 pairs can be constructed utilizing the modular concepts of this invention. (In practice the networks may range from 8000 pairs to 262,000 pairs in increments of 8000 pairs because of the packaging of two center stage modules in one cabinet.) M represents the number of center stage modules utilized and can be any integer less than or equal to K where K is the switch size, i.e., number of inputs and outputs on the switch utilized. All of these networks are full access, fully flexible, rearrangeable and expandable up to the particular ultimate size.

Figure 23:
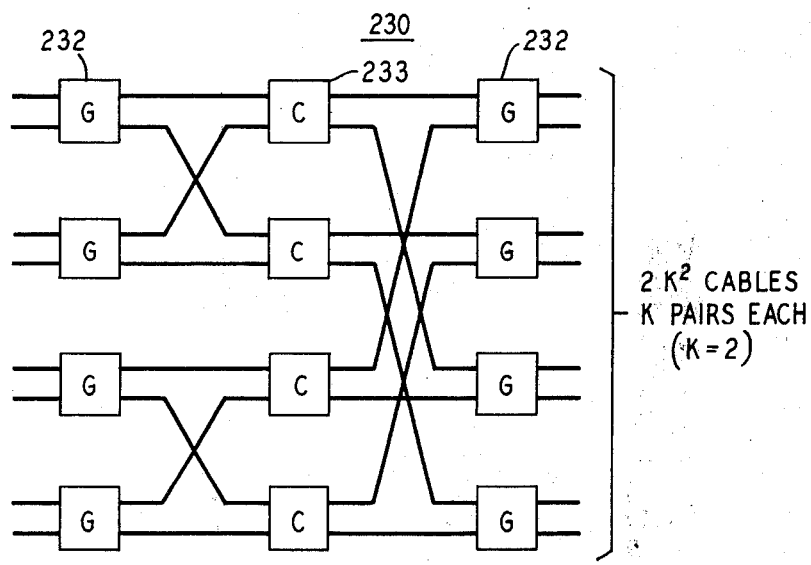
FIG. 23 is a block diagram representation of a network which is twice the size of that of FIG. 20.

"Oversize" networks can also be built from the modules 22 and 23 with a sacrifice of the rearrangeable feature. Such networks do retain the features of full access and expandability up to the oversize capacity. FIG. 23 is a modular schematic representation of a "double-size" network 230 utilizing 2 × 2 switches in center stage and growth modules 232 and 233, respectively. The use of such oversize networks, utilizing standard modules which are used for smaller networks also, to accommodate a limited number of special applications is more economical than designing new and larger capacity switches and modules even though rearrangeability is sacrificed.

Figure 24:
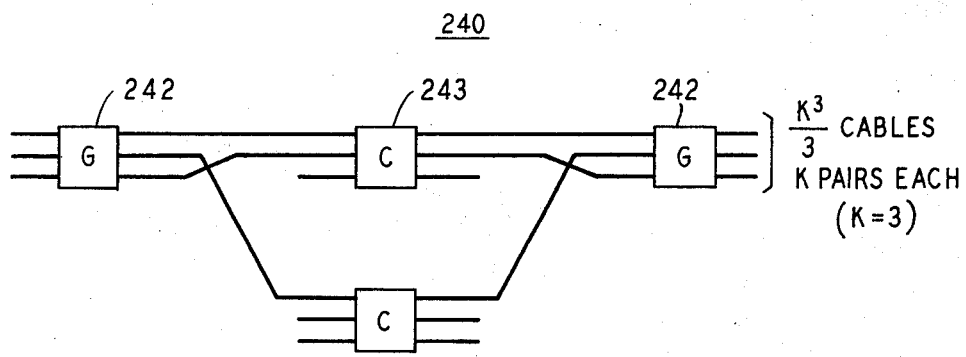
FIG. 24 is a block diagram representation of a network which is partially grown to an ultimate size that is two-thirds the size of that of FIG. 21.
Figure 25:
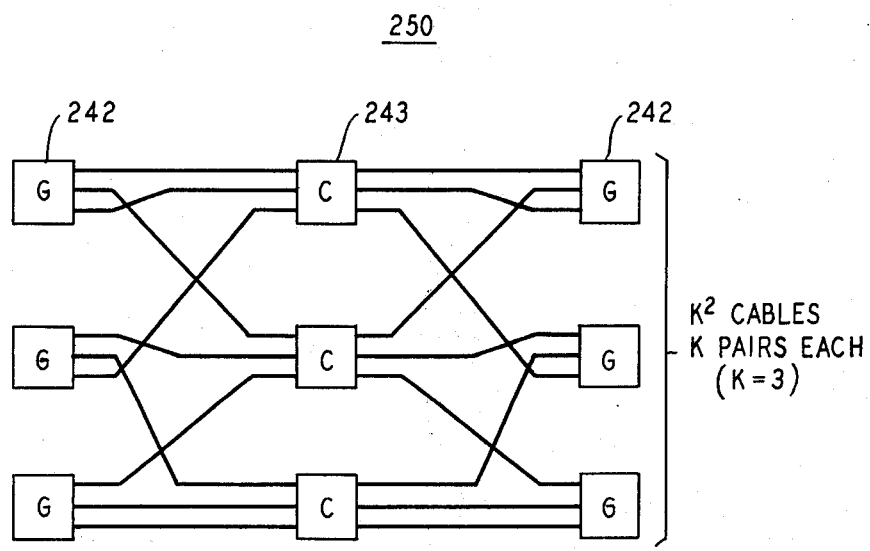
FIG. 25 is a block diagram representation of the network of FIG. 24 with ultimate size expanded to that of FIG. 21 by adding a third center module before installation of the second pair of growth modules, and connecting the second and third pairs of growth modules accordingly.

The network of this invention can also be expanded beyond an originally envisioned "ultimate" size if this size subsequently appears inadequate. For example, FIG. 24 shows a network 240 grown to half its ultimate capacity of $2K^3/3$, where K is three. The ultimate capacity can be expanded at this point by the addition of center modules, and subsequent growth modules are added as shown in FIG. 25 to form a network with capacity $K^3$.

It will also be apparent to those skilled in the art that other than square switches can be used, i.e., $K_1 \times K_2$ switches where $K_1$ does not equal $K_2$. Such switches will require different numbers of switches or modules in the various stages and provide expanding or contracting networks depending on the relative sizes of $K_1$ and $K_2$.

SUMMARY

It should be obvious from the foregoing that an automated main distributing frame system in accordance with this invention offers significant advantages over conventional manual main frames including substantial reductions in the manual labor and resulting costs involved in operating the system. The automated system eliminates many problems presently troubling conventional frames including congestion, poor record keeping and the like.

The utilization of shared actuators and passive switches greatly reduces required initial investment. The modular system providing growth without retermination also reduces initial investment. Still further, the utilization of a single-line rearrangement procedure eliminates the need for low first trial blocking which would require a substantially expanded system.

The provision of test access to both switched and nonswitched lines offers significant advantages over existing systems.

What is claimed is:

1. In a telephone system, an automated main distributing frame system comprising, in combination:
   an interconnection network comprising a plurality of serially related cross-connection stages with each said stage including a plurality of cross-connection devices, each said device including inputs and outputs;
   terminals connected to the first and last ones of said stages;
   conductor means interconnecting said stages in a predetermined pattern;
   control means for determining an exclusive path through said network for interconnecting one of said terminals with another of said terminals, said exclusive path including an exclusive cross connection in at least one of said stages;
   common actuator means shared by a plurality of said devices and automatically responsive to said control means for interconnecting respective ones of said inputs and outputs on one said device in at least one said stage to establish said exclusive cross connection without disturbing other said exclusive cross connections on said plurality of devices sharing said actuator, whereby said exclusive path is established to interconnect said one and said another of said terminals.

2. In a communications system having a plurality of outside plant terminals, and a plurality of inside plant terminals, a distributing frame cross-connection system for interconnecting selected said outside plant terminals with selected said inside plant terminals via exclusive paths comprising, in combination:
   a multistage switching network with each stage including a plurality of switches having inputs and outputs;
   conductor means interconnecting said stages in a predetermined pattern;
   control means for determining said exclusive paths through said network, each said path including an exclusive cross connection in each said stage;
   common actuator means shared by a plurality of said switches and automatically responsive to said control means for interconnecting respective ones of said inputs and outputs on one said switch in each said stage to establish said exclusive cross connection in each said stage without disturbing existing said exclusive cross connections of existing said exclusive paths in said stage whereby said exclusive path is established.

3. The combination set forth in claim 2 wherein said network comprises a five stage network and said switches comprise switches including contact means associated with respective said inputs and outputs and adapted for receiving a connector therebetween for cross connecting said inputs and outputs to establish said cross connections.

4. The combination of claim 3 wherein said actuator means includes connector placement means for placing said connector between said contact means and coordinate positioning means for positioning said placement means adjacent said contact means associated with respective said inputs and outputs so that said connector can be placed therebetween to interconnect said respective inputs and outputs and establish said exclusive cross connection.

5. The combination of claim 3 wherein each said switch includes K inputs and K outputs, the third one of said stages including MK of said switches, whereby said system has a maximum capacity for interconnecting $MK^2$ said outside plant terminals with $MK^2$ said input plant terminals, where K and M are positive integers.

6. The combination of claim 5 comprising:
   center modules each containing K of said switches of said third stage;
   input modules each including K of said switches of each of the first and second ones of said stages, each said switch of said first stage having an output to every said switch of said second stage contained within a respective input module; each said input module having $K^2$ outputs from said switches of said second stage therein connected to said switches in said third stage; and
   output modules each including K of said switches of each of the fourth and fifth ones of said stages, each said switch of said fifth stage having an input from every said switch of said fourth stage contained within a respective output module, each said output module having $K^2$ inputs from said switches of said third stage.

7. The combination of claim 6 wherein said system includes I of said input modules, O of said output modules, and M of said center stage modules where I and O are positive integers no greater than M, so that said capacity of said system can be expanded from $K^2$ to $MK^2$ of respective said outside plant terminals and inside plant terminals in increments of $K^2$ by adding said input and output modules, respectively.

8. The combination of claim 7 wherein M, I and O each equals K so that said system has a maximum capacity of interconnecting $K^3$ of said outside plant terminals with $K^3$ of said inside plant terminals and initially established ones of said exclusive path in said system can be rearranged to reduce blocking of subsequently established ones of said paths.

9. The combination of claim 8 wherein said switches comprise pin connector switches including a printed circuit board with input and output conductors thereon and said contact means comprises pin terminals associated with respective said input and output conductors and adapted to receive said connector thereover for interconnecting said pin terminals.

10. The combination of claim 7 wherein I and O are equal and wherein each said input module is symmetrically connected to said third stage with respect to one of said output modules.

11. The combination of claim 7 wherein M equals K and wherein said outputs from said switches of said second stage in said input modules and said inputs to said switches of said fourth stage in said output modules are connected to respective said switches of said third stage in said center modules in a repetitive sequence so that every said input module and every said output module each has one connection to every said switch of said third stage.

12. The combination of claim 7 wherein M, I, and O each are less than K.

13. The combination of claim 12 wherein M equals one-half K and wherein said outputs from said switches of said second stage in said input modules and said inputs to said switches of said fourth stage in said output modules are connected to respective said switches of said third stage in said center modules in a repetitive sequence so that every said input module and every said output module has two connections to every said switch of said third stage.

14. The combination of claim 7 wherein M is greater than K.

15. The combination of claim 14 wherein M equals 2K so that each said input module and each said output module is connected to one-half of said switches in said third stage in said center modules.

16. The combination of claim 6 including a center stage package comprising two of said center modules, whereby said center stage package, said input module and said output module each comprises 2K of said switches.

17. The combination of claim 6 wherein said conductor means comprises:
flat multiconductor cables connected to said inputs and outputs of said switches; and
rotator means for providing row to column transformations of said conductors in said cables so that one said cable connected to one said switch in one said stage can provide outputs to a plurality of said switches in another one of said stages.

18. The combination of claim 17 wherein said rotator means comprises a printed circuit board having plated holes therein connected to lands on respective sides of said board, said lands being arranged in rows and columns, said conductors in a first group of said cables being connected to respective rows of said lands on one of said sides and said conductors in a second group of said cables being connected to respective columns of said lands on the other of said sides, whereby outputs from one said cable in said first group are distributed to a plurality of said cables of said second group and conversely.

19. The combination of claim 18 wherein each said cable includes K conductors connected to respective said K inputs and said K outputs of a respective switch, said rotator means includes K rows and K columns of said lands so that K of said cables can be connected to each side of said rotator whereby one of said rotators can distribute said outputs from K of said switches in one of said stages.

20. The combination of claim 19 wherein each said conductor comprises a pair of conductive elements, each said terminal comprises a pair of terminal elements and each said land comprises a pair of land elements.

21. The combination of claim 6 wherein a plurality of said input, output and center modules are arranged in side-by-side relationship to form a module lineup;
said switches are mounted in rows within a respective said module in side-by-side relationship within said rows; and
said switches are slideably mounted within said respective modules so that said switches can be withdrawn from said respective modules to provide access thereto.

22. The combination of claim 21 wherein said actuator means includes:
a connector placement means for placing said connectors between said contact means;
first positioning means for moving said placement means along said lineup of modules to position said placement means adjacent a selected switch in a respective one of said modules;
means for withdrawing said selected switch from said respective module to expose said contact means; and
second positioning means for positioning said placement means adjacent selected said contact means on said selected switch so that said connector can be placed therebetween.

23. The combination of claim 22 wherein said switches include test lands thereon connected to respective ones of said inputs and outputs;
said actuator means includes connector means for engaging said test lands; and
wherein said system includes testing means responsive to said control means for testing said cross connection on a respective switch when said connector means engages said lands thereon.

24. The combination of claim 23 wherein said switch comprises a printed circuit board having input and output conductors thereon and said contact means comprise pin terminals;
said modules have front and rear surfaces with said boards being mounted on edge in side-by-side relationship within said respective modules with first and second edges thereof positioned toward said front and said rear surfaces, respectively, of said modules;

said inputs and outputs are connected to respective input and output land on said second edge; and said test lands are located on said first edge whereby said connector means can engage said test lands without disturbing said inputs and outputs.

25. The combination of claim 5 wherein K equals 64.

26. The combination of claim 3 wherein each said switch includes K1 inputs and K2 outputs where K1 and K2 are unequal positive integers.

27. The combination of claim 2 wherein said control means comprises:

means for detecting certain said existing exclusive paths having one said exclusive cross connection therein blocking a subsequent said exclusive path; and means for determining an alternate said exclusive path for one said certain existing exclusive path to thereby free said one exclusive cross connection blocking said subsequent exclusive path so that said subsequent exclusive path can be established.

28. The combination of claim 2 wherein said actuator means is responsive to said control means for disconnecting respective said inputs and outputs to terminate said exclusive cross connections without disturbing other said existing exclusive cross connections.

29. In a telephone system, the combination comprising:

a plurality of terminals having circuits connected thereto;

a multistage switching network with each stage including a plurality of switches having inputs and outputs;

conductor means interconnecting said stages in a predetermined pattern;

control means for determining an exclusive path through said network for interconnecting any one of said terminals with any other one of said terminals, said exclusive path including at least one exclusive cross connection in at least one said stage of said network; and common mechanical actuator means shared by a plurality of said switches and automatically responsive to signals from said control means for interconnecting respective said inputs and outputs on at least one said switch in at least one said stage to establish said exclusive cross connection, and automatically responsive to further signals from said control means for disconnecting respective said inputs and outputs to terminate said exclusive cross connections, without disturbing other said exclusive cross connections within said one stage.

30. The combination of claim 29 including first testing means for testing said exclusive cross connections and said circuits associated with respective terminals when said respective terminals are interconnected.

31. The combination of claim 30 including second testing means for testing all said exclusive cross connections on a respective said switch when said actuator means establishes and terminates said exclusive cross connections on said switch.

32. The combination of claim 29 including input means for enabling said control means to determine said exclusive paths for selected said terminals.

33. The combination of claim 29 wherein said terminals comprise:

first and second groups of terminals connected to the first one of said stages in said network and having outside plant circuits and test circuits, respectively, connected thereto; and third and fourth groups of terminals connected to the last one of said stages in said network and having inside plant circuits and test circuits, respectively, connected thereto.

34. In a telephone system, an automated main distributing frame switching system including a five stage switching network with terminals connected to the first and last ones of said stages, conductor means interconnecting said stages in a predetermined pattern, and control means for determining an exclusive path in said network for interconnecting any one of said terminals with any other of said terminals, said exclusive path including a connection in at least one of said stages of said network, CHARACTERIZED IN THAT said system comprises:

a plurality of switches in each said stage, said switches having inputs and outputs connected with said conductor means, said switches in the first and second ones of said stages are arranged in first modules, said switches in the third one of said stages are arranged in second modules, and said switches in the fourth and fifth ones of said stages are arranged in third modules; and actuator means shared by a plurality of said modules and responsive to said control means for interconnecting respective ones of said inputs and outputs on respective said switches in respective said modules to form said connections and establish said exclusive path.

35. An interconnection system comprising:

a plurality of input terminals;

a plurality of output terminals;

a plurality of pinboards arranged in interconnected stages between said input and said output terminals; and common mechanical means for cross-connecting one pair of pins on one of said boards in each of said stages to provide a connection between one of said input terminals and one of said output terminals.

36. An interconnection system comprising:

a plurality of interconnection boards including conductors and connection pins for interconnecting pairs of said conductors;

linking conductors inter-connecting said boards into a multistage network; and common automatic pin connector placement means for placing pin connectors across selected oaurs if said pins in each stage to provide conductive electrical paths through said network.

37. The interconnection system according to claim 36 wherein said network comprises rearrangeable and expandable series-parallel interconnections between said boards.

* * * * *